(12) United States Patent
Touzet et al.

(10) Patent No.: US 6,423,133 B1
(45) Date of Patent: Jul. 23, 2002

(54) AQUEOUS SUSPENSION BASED ON ALKALINE ALUMINIUM POLYSULPHATE, PREPARATION METHOD AND USE IN THE FIELD OF BUILDING MATERIALS

(75) Inventors: Sylvie Touzet, Antony; Jean-Yves Chane-Ching, Eaubonne; Evelyne Prat, Pantin, all of (FR)

(73) Assignee: Rhodia Chimie, Courbevoie Cedex (FR)

(*) Notice: Subject to any disclaimer, the term of this patent is extended or adjusted under 35 U.S.C. 154(b) by 0 days.

(21) Appl. No.: 09/509,784

(22) PCT Filed: Oct. 5, 1998

(86) PCT No.: PCT/FR98/02122
§ 371 (c)(1),
(2), (4) Date: Jun. 15, 2000

(87) PCT Pub. No.: WO99/18045
PCT Pub. Date: Apr. 15, 1999

(30) Foreign Application Priority Data

Oct. 3, 1997 (FR) .............................................. 97 12374

(51) Int. Cl.$^7$ .......................... C01F 11/46; D21H 21/16; C04B 40/00
(52) U.S. Cl. ...................... 106/736; 106/819; 423/556; 423/625; 423/629
(58) Field of Search ................................ 106/736, 819; 423/556, 625, 629

(56) References Cited

U.S. PATENT DOCUMENTS 5,069,893 A * 12/1991 Haase et al. ................ 423/556
5,660,625 A 8/1997 Helmboldt et al.

FOREIGN PATENT DOCUMENTS

| EP | 0 372 715 | 6/1990 |
| EP | 0 736 489 | 10/1996 |
| EP | 0 736 501 | 10/1996 |
| WO | 94 04462 | 3/1994 |

OTHER PUBLICATIONS

Chemical abstracts, vol. 110, No. 22, May 29, 1989, Abstract No. 198231g.

* cited by examiner

Primary Examiner—Elizabeth D. Wood
(74) Attorney, Agent, or Firm—Burns, Doane, Swecker & Mathis, L.L.P.

(57) ABSTRACT

The present invention relates to an aqueous suspension comprising:
A) silica and/or alumina particles, and
B) a compound of overall formula (I):

$$Al(OH)_a(SO_4)_b(SiO_x)_c(Y)_d \qquad (I)$$

with:
a between 0.1 and 2,
b between 0.3 and 1.5,
c between 0 and 0.1,
d greater than 0.05,
Y chosen from alkali metals and alkaline earth metals,
x between 2 and 4, and its derivatives, the said compound (B) being present in the suspension at a concentration of at least 1.65 mol/l, expressed as moles of aluminium issued from the said compound. Another subject-matter of the invention is a process useful for the preparation of the said suspension and its use in the field of cement pastes, mortars and concretes and in particular as setting and hardening accelerating agent for cements.

25 Claims, 5 Drawing Sheets

AQUEOUS SUSPENSION BASED ON ALKALINE ALUMINIUM POLYSULPHATE, PREPARATION METHOD AND USE IN THE FIELD OF BUILDING MATERIALS

The present invention relates to aqueous suspensions comprising at least one alkaline compound (B) in combination with silica and/or alumina, to a process of use in the preparation of these compositions and to their uses in the field of cement pastes, mortars and concretes and in particular as setting and hardening accelerating agent for cements.

Conventionally, in the concrete industries, concrete or mortar layers are applied on a substrate or surface to be concreted with the help of two spraying techniques, one by the dry route and the other by the wet route.

Processes for concrete spraying by the dry route employ a dry mixture comprising all the conventional anhydrous components of a concrete or of a mortar. This is transported to a spray nozzle, where wetting with the mixing water is then carried out. A setting accelerating agent is generally added upstream or at the spray nozzle and the mixture obtained is sprayed onto the surface to be concreted. Unfortunately, with this type of process, a phenomenon of rebound of the concrete occurs which is harmful economically and which, furthermore, represents a risk to the safety of the operator carrying out the spraying.

The process for spraying by the wet route, which employs a cement mixture which is usually thoroughly wetted, allows the two problems mentioned above to be partly solved. However, the presence of an excess amount of water affects the relative density of the concrete or mortar and, on the other hand, the introduction of a setting accelerating agent in order to compensate for this effect is harmful to the mechanical strength over time of the concrete or mortar, once it has been sprayed.

Provision has recently been made, in Patent Applications EP 736,489 and EP 736,501, for the use of mixtures based on silica and on aluminium sulphate, which are provided in the form of a reversible gel, as substitution products for conventional setting accelerating agents in the concrete industries. This type of additive advantageously proves to be less corrosive than conventional setting accelerating agents and is furthermore satisfactory economically. On being present in the sprayed concrete, it significantly reduces the phenomenon of rebound mentioned above.

The Applicant has unexpectedly found a novel family of aqueous compositions based on specific aluminium derivatives which have an even better performance than those disclosed in Patent Application EP 736,501.

The first subject-matter of the present invention is thus an aqueous suspension comprising:
A) silica and/or alumina particles, and
B) a compound of general formula (I):

$$Al(OH)_a(SO_4)_b(SiO_x)_c(Y)_d \qquad (I)$$

with:
a between 0.1 and 2,
b between 0.3 and 1.5,
c between 0 and 0.1,
d greater than 0.05,
Y chosen from alkali metals and alkaline earth metals,
x between 2 and 4, and its derivatives,
the said compound (B) being present in the suspension at a concentration of at least 1.65 mol/l, expressed as moles of aluminium issued from the said compound.

Y preferably represents a sodium atom.

The Applicant has unexpectedly found that the use of an aqueous suspension as defined above significantly increases the kinetics of curing of cement pastes, concrete or mortar, in comparison with conventional setting accelerating agents.

The examples presented below illustrate more specifically this setting accelerating effect of the suspensions according to the invention.

The compound (B) of general formula (I) comprises soluble species and solid species.

The soluble species are generally ions, indeed polyions, such as hydrolysis complexes, aluminium poly-sulphates, which optionally comprise silicates. The soluble species can be present individually within the solution or adsorbed on the silica or alumina particles.

The solid species are particles, of micron or nanometric size, of $Al(OH)_3$, $AlOOH$ and/or $Al_3(OH)_6(S_4)_2Na$, for example. In general, at least a portion of these solid species are amorphous, the others being crystal-line. These solid species can be dispersed within the dispersion or can interact with the silica or alumina particles.

According to a preferred embodiment of the invention, the compound (B) exhibits an amorphous structure after having been dried, the said structure representing at least 15% by weight of the compound (B).

More preferably, the compound (B) present in the claimed aqueous suspensions is at least partially in the form of an amorphous dispersed solid.

The amorphous nature of the dispersed solid is, within the meaning of the invention, that determined by X-rays. More specifically, the monitoring method is X-ray diffraction. On the X-ray spectrum, the amorphous nature is reflected by the presence of halos instead of the main lines. Monitoring can be carried out either on the dried suspension or on the suspension as is.

In the first case, the suspension is dried at room temperature so as to remove the free water but to retain the water of constitution of the components of the suspension. The X-ray spectrum obtained on the dry solid opens the way to the amount of crystalline solid and thus, by difference, to the amount of amorphous solid. It is necessary to remove, from this amount of amorphous solid, the amount of silica (it is amorphous) in the suspension, in order to obtain the amount of amorphous compound (B).

In the second case, the X-ray analysis is carried out directly on the aqueous suspension.

More preferably, the indices a and b present in the overall formula of the compound (B) are between approximately 0.75 and 2 and 0.3 and 1.2 respectively.

According to a preferred embodiment of the invention, the said suspension comprises approximately from 2.1 to 3.5 mol/l of aluminium, approximately from 2.25 to 4 mol/l of sulphate and approximately from 0.2 to 3.5 mol/l of silica.

The suspension according to the invention has a pH (measured according to ISO Standard 787/9) of between 2.5 and 4. According to a preferred embodiment of the invention, it has a value of between 3 and 4 and more preferably is of the order of 3.7.

The claimed aqueous suspensions advantageously constitute an optimum with respect to the compromise of the properties desired in the field of cements, mortars and concretes. These properties are accelerated hardening and setting kinetics and an increased mechanical strength of the cured grouts, mortars or concretes incorporating them.

An optimization in one of these kinetics is generally acquired at the expense of the mechanical strength, and vice versa. Surprisingly, the claimed aqueous suspensions significantly accelerate the hardening kinetics, in comparison with a conventional suspension based on a silica/aluminium sulphate mixture, without affecting the long-term mechanical properties of the mortars incorporating them. These properties remain entirely satisfactory. These results are presented in more detail in the examples below.

According to a privileged embodiment of the invention, the aqueous suspension comprises a compound (B) of general formula I in which a has a value of the order of 1.26±0.1, 0.5±0.1 or 0.88±0.1.

The aqueous suspensions comprising a compound (B) of general formula I in which a is between 0.1 and 1.5, with the said suspension comprising approximately from 2.2 to 3.1 mol/l of aluminium and approximately 2.3 to 3.9 mol/l of sulphate, are more particularly preferred.

Mention will very particularly be made, as representative of the claimed aqueous suspensions, of the suspensions described in the examples below.

According to a preferred alternative form of the invention, the claimed aqueous suspensions exhibit a silica concentration of between approximately 0.7 and 2.4 mol/l.

The compound (B) is used in combination, in the aqueous suspensions provided according to the invention, with at least one compound selected from:
  a silica, chosen in particular from fumed silicas, precipitated silicas, silica sols, silica gels, pyrogenic silicas, silica compounds of natural or synthetic origin, aluminosilicates, smectites, magnesium silicates, clays, wollastonite, talc, mica, attapulgite, sepiolite, montmorillonite or bentonites,
  an alumina.

In addition, the aqueous suspensions according to the invention can comprise a metal or alkali metal sulphate of sodium sulphate, iron sulphate or aluminium sulphate type, and the like. It is preferably sodium sulphate.

The claimed suspensions can also incorporate calcium silicates and aluminates.

Thus, in the specific case where the aqueous suspension combines a observed with the compound (B), a beneficial effect is recorded on the activity as setting accelerating agent of the said suspension, which is reflected in particular by a significant decrease in the rebound phenomenon observed when concrete is sprayed.

As regards more particularly the silica included in the suspension according to the invention, a silica chosen from fumed silicas, precipitated silicas, silica compounds of natural or synthetic origin, comprising in particular silicas chosen from aluminosilicates, for example Tixosil 28® sold by Rhône-Poulenc, smectites, magnesium silicates in general, and their mixtures, is very particularly suitable. Use is preferably made, as silica, of at least one precipitated silica.

Precipitated silica is understood to mean, in this instance, a silica obtained by precipitation from the reaction of an alkali metal silicate with an acid, generally an inorganic acid, at an appropriate pH of the precipitation medium, in particular a basic, neutral or only slightly acidic pH.

The silica can be prepared in any way (addition of acid to a silicate vessel heel, simultaneous complete or partial addition of acid or silicate to a vessel heel of water or of silicate solution, and the like) and the preparation method is chosen as a function of the type of silica which it is desired to obtain. At the end of the precipitation stage, there is generally a stage of separation of the silica from the reaction mixture according to any known means, filter press or vacuum filter, for example; a filtration cake is thus collected, which cake is washed, if necessary; this cake, optionally after breaking up, can be dried by any known means, in particular by atomization, and then optionally milled and/or agglomerated. These combined procedures form the subject of a detailed description in Application EP 736,501, to which reference will be made.

The precipitated silica preferably present in the suspension according to the invention generally exhibits a CTAB specific surface of between 50 and 250 $m^2/g$, in particular between 100 and 240 $m^2/g$.

The suspension according to the invention advantageously comprises a precipitated silica having a very good ability to disperse and to deagglomerate.

A precipitated silica as disclosed in European Patent Application EP 520,862 can thus be employed.

The precipitated silicas disclosed in Application EP 736,489 can also be provided as representative of the precipitated silicas which can be employed in the claimed suspensions.

The silica, in particular the precipitated silica, present in the suspension according to the invention can be finely divided, in particular as the result of milling (for example wet milling) or deagglomeration with ultrasound.

A second aspect of the present invention relates to a process useful for the preparation of aqueous suspensions based on at least one compound (B) of general formula I as described above.

More specifically, another subject-matter of the present invention is a process useful for the preparation of an aqueous suspension as described above, characterized in that it comprises the stages consisting in:
  A—mixing aluminium sulphate, silica and/or alumina particles, and optionally water;
  B—optionally adding, to the mixture obtained according to Stage A, an alkaline silicate in the form of an aqueous solution and homogenizing the said mixture at room temperature;
  C—adding, to the mixture obtained according to Stage B, an alkaline aluminate in the form of an aqueous solution, with vigorous stirring and at room temperature;
  D—bringing the combined mixture to a temperature of between 40 and 90° C. and recovering the expected suspension.

According to a preferred alternative form of the invention, an aluminium sulphate is incorporated during the preparation process. This can be added either on a single occasion during one of the stages of the said process or on several occasions in Stages A, B, C and D of the process. It can be added in the powder or solution form.

Thus, it can be mixed either in the solid state, that is to say in the form of a powder, or in the molten state, that is to say in the form of a solution brought to a temperature of between 95+ C. and 130° C.

More preferably, the aluminium sulphate is added in the form of a powder or of a solution during Stage A.

As regards the silica and/or the alumina employed in Stage A, they are introduced in the form of suspension(s) or of powder(s).

It is preferably an aqueous silica suspension and more preferably an aqueous suspension of a precipitated silica, such as those disclosed in Application EP 736,501. This aqueous precipitated silica suspension may have been obtained beforehand by mechanically breaking up a filtration cake resulting from a silica precipitation reaction. As regards the procedures for the preparation of such a filtration cake and for breaking up, reference will be made to the description in Application EP 736,489. The examples which appear below exhibit a specific embodiment of this process.

As regards stage B, use may be made, as silicate, of any common form of silicate, such as metasilicates, disilicate and advantageously an alkali metal M silicate, in which M is sodium or potassium.

The silicate preferably has a molar ratio $Rm=SiO_2/Na_2O$ of between 3 and 3.8.

Stage B is preferably carried out at a temperature of between 10 and 40° C. and more preferably at room temperature. The silicate is incorporated in the mixture of Stage A in the form of a concentrated solution and with vigorous mechanical stirring.

The third stage C relates to the incorporation of the aluminate. This is also added in the form of a concentrated solution and with vigorous stirring. As regards the method of stirring, it can be shearing applied by a homogenizer of UltraTurrax® type.

The so-obtained mixture is subjected, in Stage D, to a temperature treatment, so as to complete the homogenization of the combined reaction mixture. This heat treatment can, for example, consist of a temperature rise over one hour to a temperature of between 50 and 90° C., preferably of the order of 65° C., and the maintenance of the mixture at this temperature for approximately one hour, on completion of which the mixture is allowed to cool naturally.

It is clear that the silica, aluminium sulphate, silicate and aluminate concentrations are adjusted so as to obtain an aqueous suspension as characterized according to the present invention.

As stated previously, the claimed aqueous suspensions are particularly advantageous in the preparation of cement pastes, concretes and mortars.

The advantages obtained are due in part to the use of the compound (B) and are particularly optimized when the compound (B) is used in combination with silica and is provided in the form of a suspension as described above.

Consequently, another aspect of the present invention relates to the use of the compound (B) in the field of building materials.

Thus, it can be employed in the preparation of cement pastes (grouts or wetted compositions formed from cement and water and, optionally, conventional additives), mortars and concretes and more particularly as setting and/or hardening accelerating agent for cement pastes, mortars or concretes.

In these applications, the compound (B), preferably in the form of a suspension according to the invention, introduces noteworthy and unexpected advantages which are of particular interest in the field of sprayed grouts, mortars and concretes.

As explained above, the compound (B), preferably in the form of a suspension as claimed, constitutes an optimum with respect to the compromise in properties: kinetics of hardening/kinetics of setting/mechanical strength of the cured grouts, mortars or concretes.

Thus, in the specific case where the amount of compound (B) used to prepare the cement paste, mortar or concrete, expressed in moles, is greater than approximately 0.003 mol per 100 g of cement, a particularly rapid curing of the sprayed layer is observed, making it possible to work with maximum safety, for example under vaulting, from a few hours after spraying (application for the preparation of structural mortars, in particular).

The use of the aqueous suspensions described above is preferred. They do not damage the mechanical properties of the cement compositions in the long term. On the contrary, it is found that they result in high compressive strength values at 28 days, in particular when they are used in an amount such that the amount by mass of silica employed (expressed as anhydrous silica) is between 0.2 and 5%, in particular between 0.4 and 2.5%, with respect to the mass of cement employed to prepare the cement paste, mortar or concrete.

On this account, they are thus particularly advantageous in the application of layers of cement pastes, concretes or mortars by spraying techniques.

Firstly, they can be pumped perfectly well by conventionally used spraying equipment.

The health and safety conditions, in particular for the operator carrying out the spraying process, are improved due to the very weakly irritating nature of the suspension according to the invention by virtue in particular of its pH of between 2.5 and 4.

The use of the suspensions according to the invention makes it possible in addition to limit spraying losses by rebound and to obtain very thick sprayed layers, resulting in an increase in productivity. This is possible in particular by virtue of the homogeneity, the cohesion and/or the adhesion (sticky aspect) of these cement compositions.

They also promote cold weather concreting.

Finally, the suspensions according to the invention can be employed in the preparation of cement pastes (grouts or wetted compositions formed from cement and water and optionally conventional additives), mortars and concretes for the consolidation of oil wells.

In fact, following a drilling operation, cement has to be placed between the pipes, which have to case the well, and the wall of the hole in order to render this annular space leaktight. Depending on the depth of cement to be emplaced, specific additives can be added to the cement in order to adjust its hydraulic and mechanical characteristics, which are affected by the temperature and the pressure, which vary with the depth. In some cases, in particular in regions close to the seabed, where temperatures are in the region of 4° C., the setting times of the mixtures are excessively long. It is then necessary to improve their homogeneity in the expectation of curing.

Use is preferably made of the suspensions according to the invention at a concentration, expressed in moles of compound (B) of general formula I of greater than approximately 0.003 mol per 100 g of Cement employed to prepare the cement paste, mortar or concrete. A particularly rapid curing of the mixture is thus obtained.

Another subject-matter of the present invention is a process for spraying concrete or mortar involving the application of a layer of concrete or mortar on a surface, characterized in that a compound (B) as described above is added just upstream or at the place of the spraying means. This process can be carried out by the dry route or, preferably, by the wet route.

According to a specific form of the invention, use is made of an amount such that the concentration in moles of the said compound (B) is greater than approxi- mately 0.003 mol per 100 g of cement employed to prepare the concrete or mortar.

The compound (B) is preferably introduced in the form of an aqueous suspension as defined above.

According to one embodiment of the invention, the process is carried out by the dry route.

Generally, a dry mixture of concrete or of mortar is then formed, the said mixture is transferred in order to be introduced into a spraying means, the compound (B), preferably in the form of an aqueous suspension in accordance with the invention, is added to the mixture just upstream or at the place of the spraying means and the resulting mixture is sprayed from the spraying means onto the surface or substrate to be coated.

The compound (B), preferably in the form of a claimed aqueous suspension in accordance with the invention, and the mixing water can be introduced into the dry mixture separately, that is to say by two different means (for example using two different pumps). They can also be introduced into the mixture jointly, that is to say by the same means; they are then in particular mixed with one another prior to their introduction into the said mixture. The use of the suspension according to the invention makes it possible to reduce the rebound and to decrease the formation of dust.

It should be noted that the claimed aqueous suspension can be employed, in particular, as mixing water.

Although the spraying process can be carried out by the dry route as described above, its implementation by the wet route gives particularly excellent results.

Thus, according to a preferred embodiment of the invention, the process is carried out by the wet route.

Generally, a mixture of wetted concrete or mortar is then formed, the said mixture is transferred in order to introduce it into a spraying means, the compound (B), preferably in the form of an aqueous suspension as claimed, is added to the said wetted mixture just before or at the spraying means and the resulting mixture is sprayed from the spraying means onto the surface (or substrate).

In both embodiments of the invention, the means used to form the dry mixture or the wetted mixture, to transfer and then introduce this mixture into the spraying means and to spray the mixture onto the surface to be concreted from the said means correspond to those commonly employed in the field of spraying concrete or mortar and are thus well known to the person skilled in the art.

Thus, the dry mixture and the wetted mixture are generally each formed by mixing the products of which they are composed; the said products can be introduced into the mixer in any order; for example, in the case of the wet-route spraying process, the aggregates (sand in the case of a mortar; coarser aggregates, such an gravel and/or pebbles, and generally sand, in the case of a concrete) and the cement are first mixed with one another, the water subsequently being introduced, and the wet mixture thus formed finally being mixed.

Additives, such as a plasticizer, for example, can optionally be incorporated at any appropriate time during the preparation of the dry mixture (dry-route process) or of the wetted mixture (wet-route process) Mention may be made, as plasticizers, of in particular melamine, sodium polynaphthalenesulphonate, sodium polyacrylate or sodium polycarboxylate.

It is also possible to incorporate reinforcing fibres, such as poly(vinyl alcohol) fibres, polypropylene fibres, steel fibres, polyacrylonitrile fibres, cellulose fibres, carbon fibres, Kevlar® fibres, polyamide fibres, polyethylene fibres, and the like.

Furthermore, in the case of the dry-route spraying process, the mixture formed under dry conditions is introduced into the spraying means generally after having been transported using a stream of compressed air in a pipe (or conduit); in the case of the wet-route process, the wetted mixture is introduced into the spraying means generally after having been conveyed using an appropriate pump, for example a piston pump or a screw pump, in a pipe (or conduit).

The compound (B), preferably in the form of an aqueous suspension in accordance with the invention, can be introduced just before or at the spraying means, for example via a metering pump.

The spraying means is usually composed of a spray nozzle; the combination formed from the dry mixture, the mixing water and the compound (B), preferably in the form of a claimed aqueous suspension, is then sprayed, from this spray nozzle, generally using propellent air which feeds the said nozzle, the propellent air usually being compressed air.

The use of the compound (B), preferably in the form of an aqueous suspension as defined according to the invention, and its point of introduction into the mixture are essential characteristics of the invention.

The examples and figures presented below illustrate the invention without, however, limiting the scope thereof.

EXAMPLE 1

Preparation of an $SiO_2$-free 2.37M Aqueous Compound (B) Composition 600 ml of an aluminium sulphate solution which is 2M with respect to Al are poured into a reactor equipped with a stirrer of Ultraturrax type. The geometry of the reactor is defined so as to obtain maximum shearing by choosing, for example, a reactor with a low surface area and a high height. After starting the stirrer, 37.6 ml of a sodium silicate solution, of Rm=molar $(SiO_2/Na_2O)$=3.45 and which is 5.72M with respect to $SiO_2$, are added continuously at room temperature. The addition is carried out over a period of approximately 3 min. 94 ml of a sodium aluminate solution which is 5.7M with respect to Al are subsequently added continuously at room temperature, still with vigorous shearing. The addition is carried out over a period of approximately 8 min.

The dispersion obtained is subsequently transferred into a jacketed reactor furnished with a thermostatically-controlled chamber. The combination is stirred and a heat treatment is carried out according to the following profile:

temperature rise over 60 min to 65° C.

stationary temperature phase at 65° C. for 60 min natural cooling.

The dispersion obtained exhibits the following characteristics:

OH/Al=1.23

Al=2.37M $SO_4$=2.46M.

It is known as PASS 2.4M.

It has a milky appearance and requires stirring in order to prevent separation by settling. It is a suspension of dispersed solids.

EXAMPLE 2

Preparation of $SiO_2$-free Aqueous Compositions with a Low Concentration of Compound (B) of Pverall formula I 10 ml of the composition prepared in Example 1 are taken and 2.33 ml of demineralized water are added with stirring at room temperature. The dispersion thus obtained exhibits an aluminium concentration of 1.92M. It is known as PASS 1.9M.

10 ml of the composition of Example 1 are taken and 4.06 ml of demineralized water are added with stirring at room temperature. The dispersion thus obtained exhibits an aluminium concentration of 1.69M.

It is known as PASS 1.7M.

It has a milky appearance and requires stirring in order to prevent separation by settling. It is a suspension of dispersed solids.

EXAMPLE 3

Determination of the Hardening Kinetics Obtained with the Aqueous Compositions of Examples 1 and 2

Cement grouts are prepared in the following way:

40 g of water, 8 g of one of the aqueous compositions prepared according to Examples 1 and 2, and 100 g of cement are introduced into a 250 ml cylindrical mould (the clock is started) and mixing is carried out for one minute using a stirrer of RW 20® type equipped with a three-bladed propeller. The grout is subsequently tapped down with gentle tapping motions. The monitoring measurements on the hardening are made using a Stevens® texturometer.

The Stevens® texturometer is a device which allows the measurement of the force necessary for a probe to penetrate into the grout. Its technical characteristics are as follows:

TA 1000 force sensor (from 5 to 1000 g, i.e. from 0.049 to 9.81 N);

rate of penetration 0.2 mm/s;

depth of penetration 4 mm;

probe: ½' needle, diameter for TA 1000, cross-section.

A measurement is made every minute approximately between 2 and 15 minutes (halt before 15 minutes if the force scale stop is reached).

Figure 1:
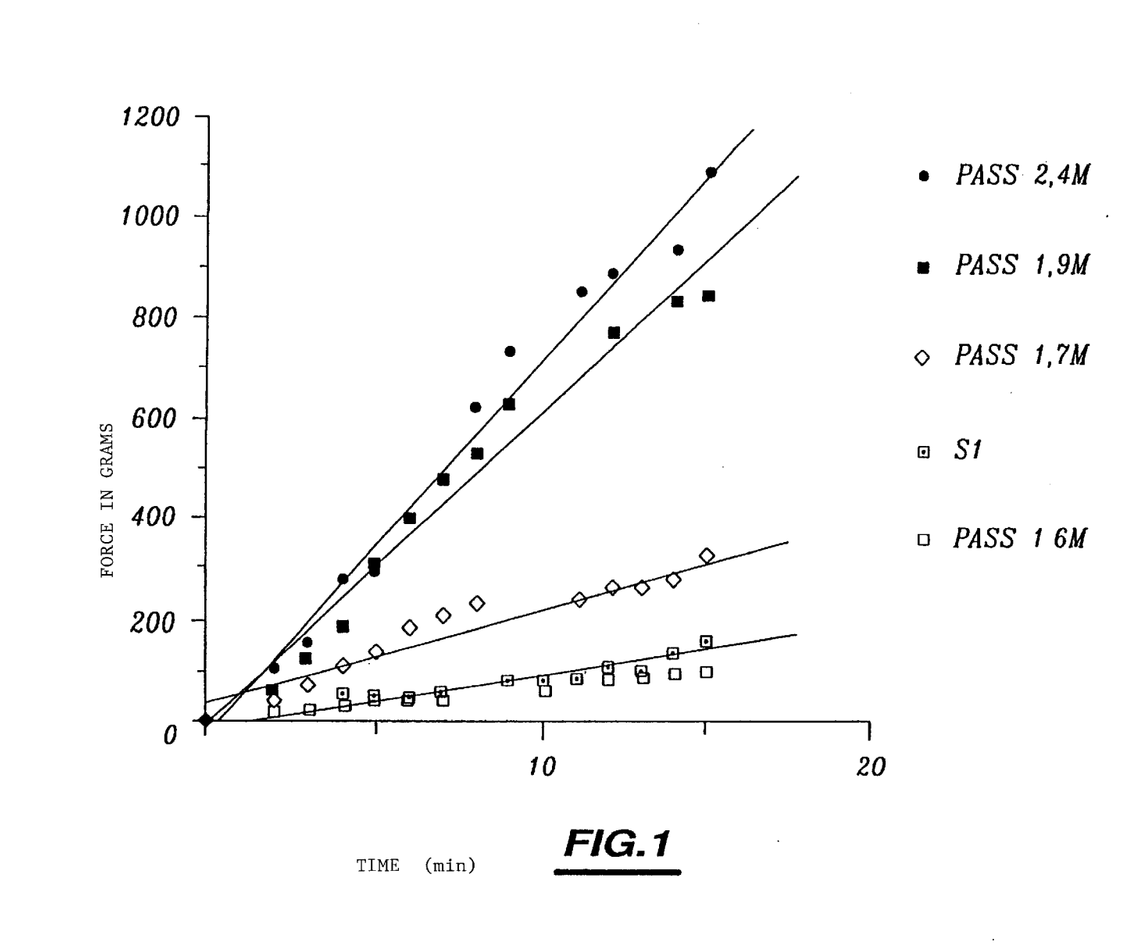
FIG. 1 is a representation of the hardening kinetics obtained with two control mortars and mortars to which have been added 8% of aqueous suspensions in accordance with the invention.

The results obtained are represented in FIG. 1, which also describes the kinetics obtained with a first control composition, comprising a concentration of 1.64 mol/l of the same compound (B) with an aluminium concentration of 1.6 [lacuna], and a second control composition, known as S1, based on an aluminium sulphate, which composition is obtained according to Example 6 below.

It is noted that the best hardening kinetics are obtained with compositions having a concentration of compound B of the order of or greater than 1.65 mol per liter.

EXAMPLE 4

Preparation of a Precipitated Silica Cake G1

The following are introduced into a stainless steel reactor equipped with a propeller stirring system and with jacketed heating:

346 liters of water 7.5 kg of $Na_2SO_4$ (electrolyte)

587 liters of aqueous sodium silicates exhibiting an $SiO_2/Na_2O$ ratio by weight equal to 3.50 and a relative density at 20° C. equal to 1.133.

The concentration of silicate (expressed as $SiO_2$) in the vessel heel is then 85 g/l. The mixture is brought to 79° C. while keeping it stirred. 386 liters of dilute sulphuric acid, with a relative density at 20° C. equal to 1.050, are subsequently introduced into the mixture until a pH value equal to 8 is obtained (measured at the temperature of the mixture).

The temperature of the reaction mixture is 79° C. during the first 25 minutes, then it is brought from 79° C. to 86° C. over 15 min and subsequently maintained at 86° C. until the end of the reaction.

Once the pH value equal to 8 has been achieved, 82 liters of aqueous sodium silicate, with an $SiO_2/Na_2O$ ratio by weight equal to 3.50 and with a relative density at 20° C. equal to 1.133, and 131 liters of acid of the type described above are jointly introduced into the reaction mixture, this simultaneous introduction of acid and silicate being carried out so that the pH of the reaction mixture is constantly equal to 8±0.1. After all the silicate has been introduced, introduction of the dilute acid is continued for 9 min, so as to bring the pH of the reaction mixture to a value equal to 5.2. The introduction of acid is then halted and the reaction slurry is kept stirred for an additional 5 min.

The total duration of the reaction is 118 min.

A precipitated silica slurry is obtained, which silica is filtered off and washed by means of a filter press, so that a silica cake G1 is finally recovered with a loss on ignition of 78% (thus a dry matter content of 22% by weight) and with an $Na_2SO_4$ content of 1% by weight.

EXAMPLE 5

Preparation of a Silica Suspension G2

4 kg of the cake G1 prepared in Example 4 (obtained by filter pressing and exhibiting a dry matter content of 22% by weight and an $Na_2SO_4$ content of 1% by weight), brought beforehand to 60° C., are introduced into a Cellier disintegrator-mixer.

During the deflocculation of the cake, 13.1 ml of a sodium aluminate solution (having an $Al_2O_3$ content of 22% by weight and an $Na_2O$ content of 18% by weight (relative density: 1.505)) and 7.47 ml of an 80 g/l sulphuric acid solution (relative density: 1.505) are then simultaneously introduced, so as to maintain the pH at a value of 6.5.

The $Al/SiO_2$ ratio by weight is approximately 2600 ppm.

The mixture is allowed to mature for 20 minutes while continuing the mechanical deflocculation.

The silica suspension G2 obtained is characterized by:

a viscosity of 0.06 Pa·s (measured under a shear of 50 $s^{-1}$ for 1 minute);

a particle size such that $d_{10}=5$ μm, $d_{50}=19$ μm and $d_{90}=60$ μm.

After storage for one week, the following are observed:

the formation, at the bottom of the storage container, of a deposit which is inordinately difficult, indeed impossible, to redisperse;

an increase in the viscosity of the suspension; its viscosity is then 0.45 Pa·s (measured under a shear of 50 $s^{-1}$ for 1 minute).

EXAMPLE 6

Preparation of a Control Aqueous Silica Suspension S1

1.020 kg of the G2 suspension prepared in Example 5 (withdrawn after breaking up), exhibiting a dry matter content of 22% by weight, and 85 grams of water are added to 1150 grams of aluminium sulphate hydrate $Al_2(SO_4)_3 \cdot 17H_2O$, molten at 110° C. in its water of crystallization.

The addition is carried out over approximately fifteen minutes.

A homogeneous suspension G3 is obtained which exhibits the following characteristics:

| | |
|---|---|
| pH | 2.3 |
| dry matter content (% by weight) | 37.0 |
| silica content (% by weight) (calculated as anhydrous silica) | 10.0 |
| aluminium sulphate content (% by weight). (calculated as anhydrous aluminium sulphate). | 27.0 |

It is noted that, after standing for 24 hours, the said suspension sets solid and is thus provided in the form of a gel. It is denoted below by "S1".

EXAMPLE 7

Preparation of an Aqueous Silica suspension S2 According to the Invention 268 ml of an aqueous aluminium sulphate/SiO$_2$ particles dispersion are poured into a reactor equipped with an Ultra-Turrax®. This dispersion exhibits an Al concentration of 2.2M, an SO$_4^{2-}$ concentration of 3.3M and a concentration of silica particles, expressed as SiO$_2$, of 2.3M. This dispersion is prepared according to the procedure described in Example 6 and is diluted with demineralized water, so as to exhibit the abovementioned concentrations. The geometry of the reactor is defined so as to obtain maximum shearing by choosing, for example, a reactor with a low surface area and a high height.

After starting the Ultra-Turrax®, 17 ml of sodium silicate solution, with Rm=SiO$_2$/Na$_2$O=3.35 and with Si concentration=3.9M, are added continuously at room temperature.

The addition is carried out over a period of approximately one minute. 48 ml of sodium aluminate solution with an Al concentration of 5.7M are subsequently added continuously and at room temperature, still with vigorous shearing. The addition is carried out over a period of approximately 4 minutes.

The dispersion obtained is subsequently transferred into a jacketed reactor furnished with a thermostatically-controlled chamber. The combination is stirred and a heat treatment is carried out according to the following profile:

temperature rise over 60 minutes to 65° C.;

stationary temperature phase at 65° C. for 60 minutes;

natural cooling.

The dispersion obtained exhibits the following characteristics:

Al=2.6M

SO$_4$=2.7M

SiO$_2$=2.05M

OH/Al=1.4.

The dispersion, denoted "S2", is stable with respect to separation by settling over time.

EXAMPLE 8

Preparation of an Aqueous Silica Suspension according to invention S3.

By repeating the procedure described in Example 7 but by adding 53.3 g of Al$_2$(SO$_4$)$_3$.15.66H$_2$O gradually over approximately 5 minutes at the end of the stationary temperature phase. The mixture is left stirring under temperature for 5 minutes. The dispersion is cooled naturally. An aqueous suspension is obtained which has the following characteristics:

Al=3M

SO$_4$=3.2M

OH/Al=1.18.

The suspension is denoted "S3" below.

EXAMPLE 9

Determination of the Hardening Kinetics Obtained with Aqueous Suspensions in Accordance with the Present Invention Cement grouts are prepared in the following way:

40 g of water, 10 g of suspensions S1, S2 and S3 prepared according to the preceding examples and 100 g of cement are introduced into a 250 ml cylindrical mould (the clock is started) and mixing is carried out for one minute using a stirrer of RW 20® type equipped with a three-bladed propeller. The grout is subsequently tapped down with gentle tapping motions. The monitoring measurements on the hardening are made using a Stevens® texturometer described previously.

A measurement is made every minute approximately between 2 and 15 minutes (halt before 15 minutes if the force scale stop is reached).

Figure 2:
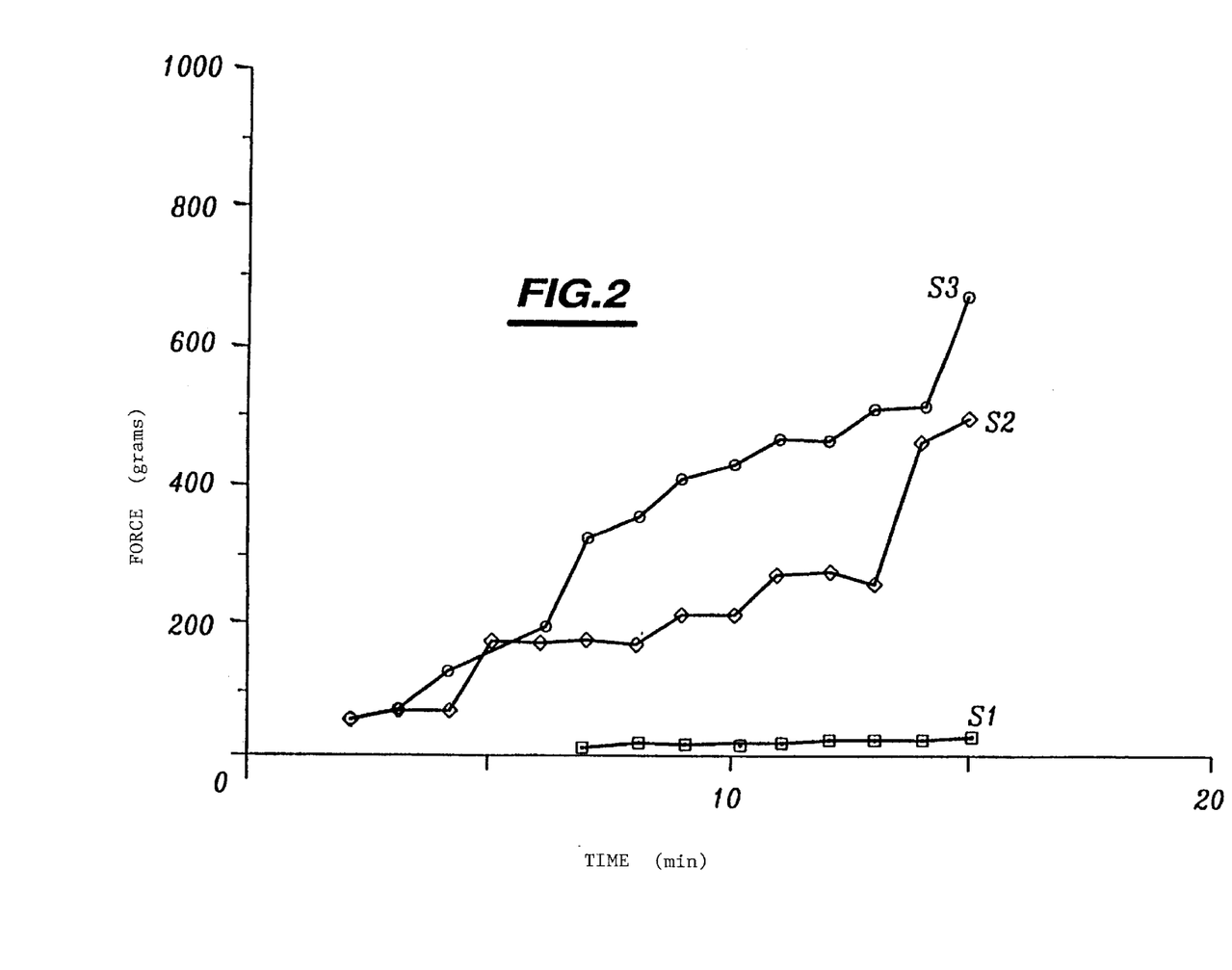
FIG. 2 is a representation of the hardening kinetics obtained with a control mortar and mortars to which have been added 10% of aqueous suspensions in accordance with the invention.

The results obtained with a CEM I 52.5 OPA cement and 10 g of S1, S2 or S3 are shown in FIG. 2.

It is noted that the suspensions S2 and S3 (comprising compounds (B)) activate much more strongly the hardening kinetics than the suspension S1 (based on aluminium sulphate).

EXAMPLE 10

Mortars are prepared from 450 g of high-strength Portland cement (corresponding to European Standard CEM I 52.5), 1350 g of standardized sand, 225 g of water (water/cement=0.5), 4.5 g of GT resin (1% of super-plasticizer) and x % of S1 or S2 suspension with respect to the mass of cement.

The procedure is as follows:

The water, GT resin and cement mixture is introduced into a mixer of Perrier® type. Mixing is carried out at moderate speed while adding the sand, mixing is then carried out for two minutes at high speed (≈120 revolutions/minute), the accelerating agent is introduced and mixing is carried out for two minutes at high speed (≈120 revolutions/minute).

The kinetics of setting are then monitored with a Vicat needle in accordance with NF Standard P 15-414. The times at which setting begins are shown in Table I below:

TABLE I

| x | S1 | S2 |
|---|---|---|
| 0 | 150 | 150 |
| 6 | 100 | 100 |
| 8 | 40 | 45 |

The S1 and S2 suspensions result in comparable setting kinetics.

The mechanical strengths were measured at 7 and 28 days on 4×4×6 test specimens broken with a Toni Technick type 202 press.

Figure 3:
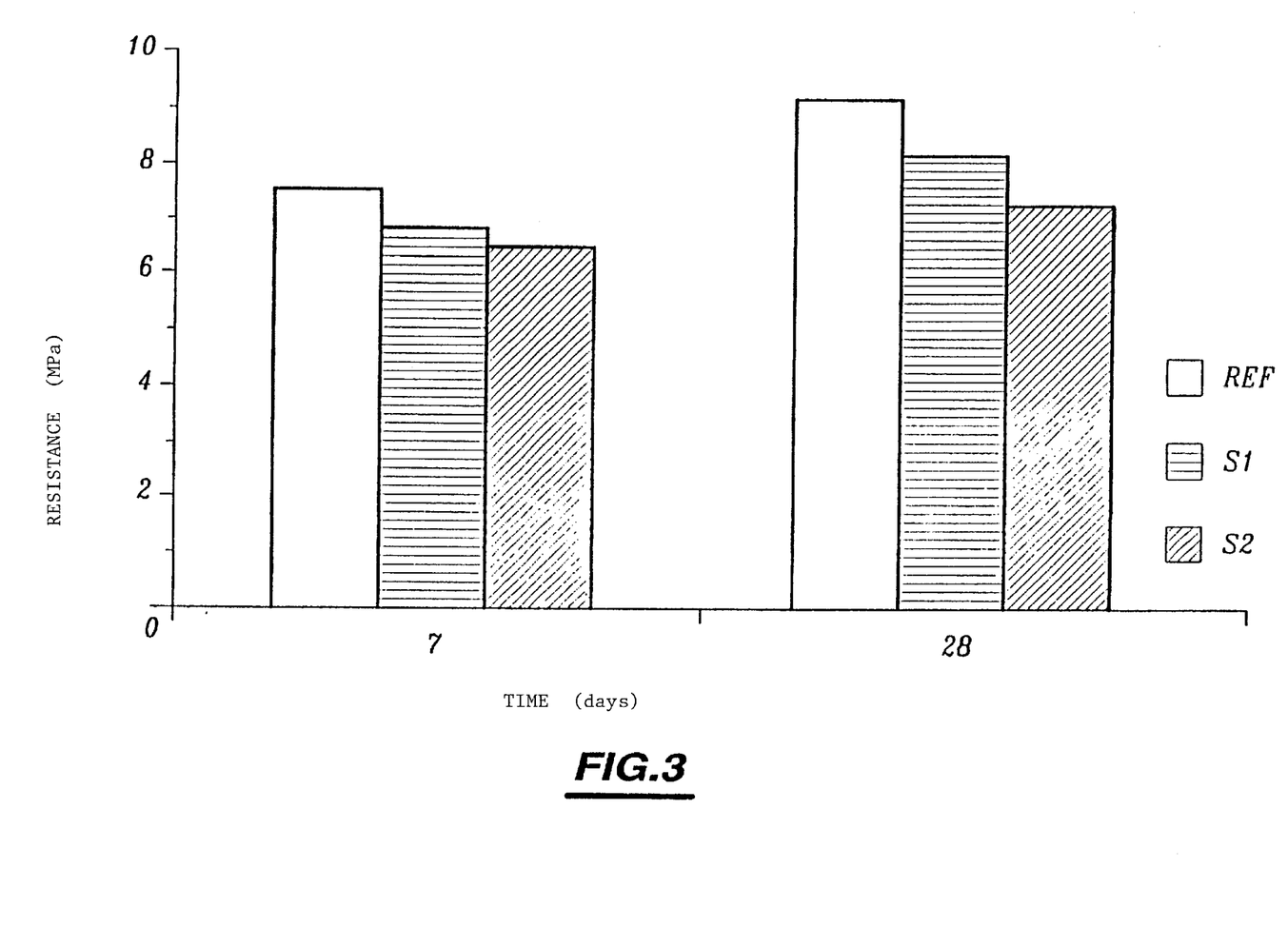
FIG. 3 is a representation of the flexural tensile strength obtained with a control mortar and mortars to which have been added 6% of suspensions S1 and S2.
Figure 4:
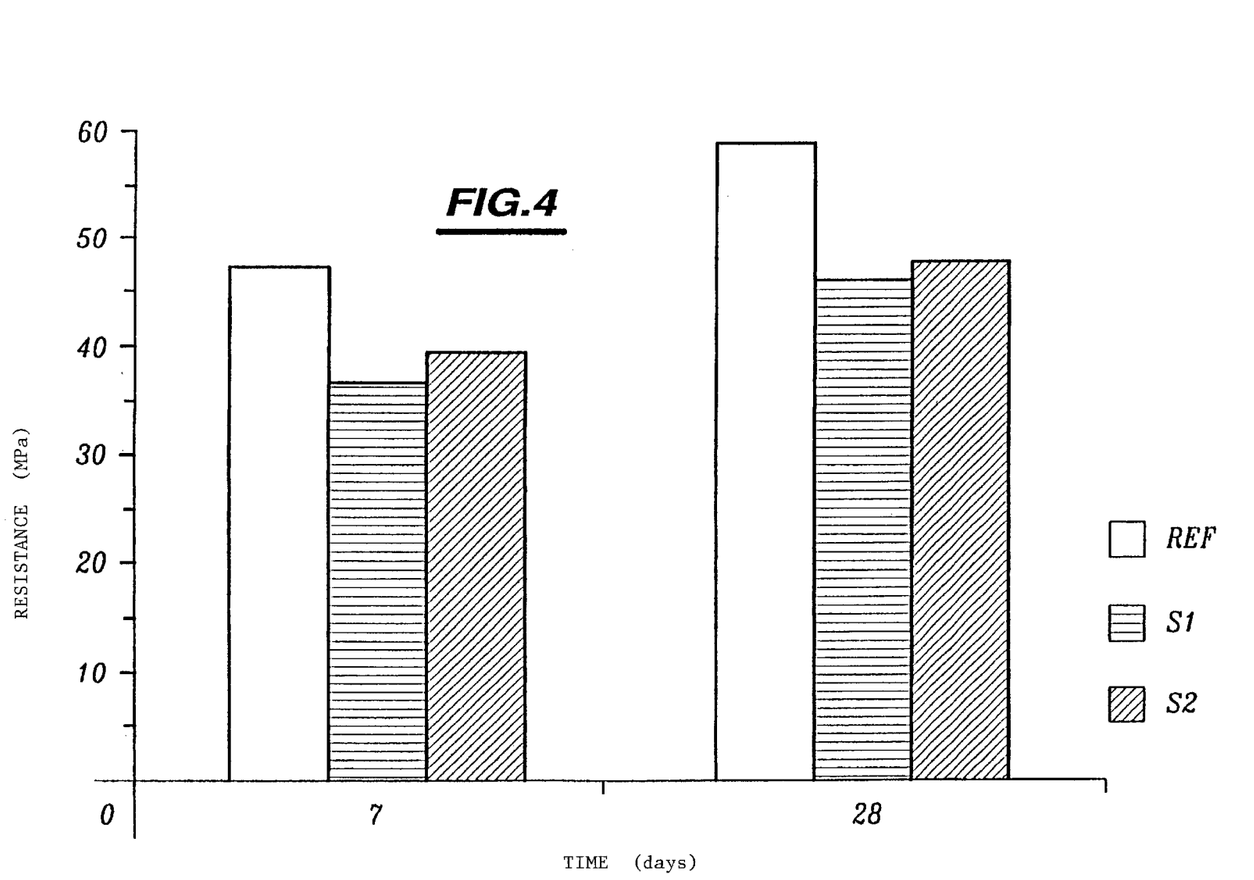
FIG. 4 is a representation of the simple compressive strength obtained with a control mortar and mortars to which have been added 6% of suspensions S1 and S2.

The flexural tensile strengths and simple compressive strengths obtained with the reference mortar (x=0) and with the mortars to which have been added 6% of S1 or S2 suspensions are shown in FIGS. 3 and 4.

The mechanical strengths obtained with the S1 and S2 suspensions are substantially equivalent and equal to approximately 80 to 90% of the strengths of the reference mortar.

These results clearly demonstrate that the strong activation of the hardening given by the use of compound (B) and silica suspension is not achieved at the expense of the long-term mechanical properties of the mortars.

EXAMPLE 11

Characterization of the Dried Products by X-ray Diffraction

An X-ray diffraction analysis (X-ray diffraction—Philips PW 1800 device) is carried out firstly on the S1 and S2 products after drying at room temperature.

The spectrum obtained on the S1 product after drying shows a high proportion of crystalline aluminium sulphate: 90% of the Al participates in a crystalline phase.

Figure 5:
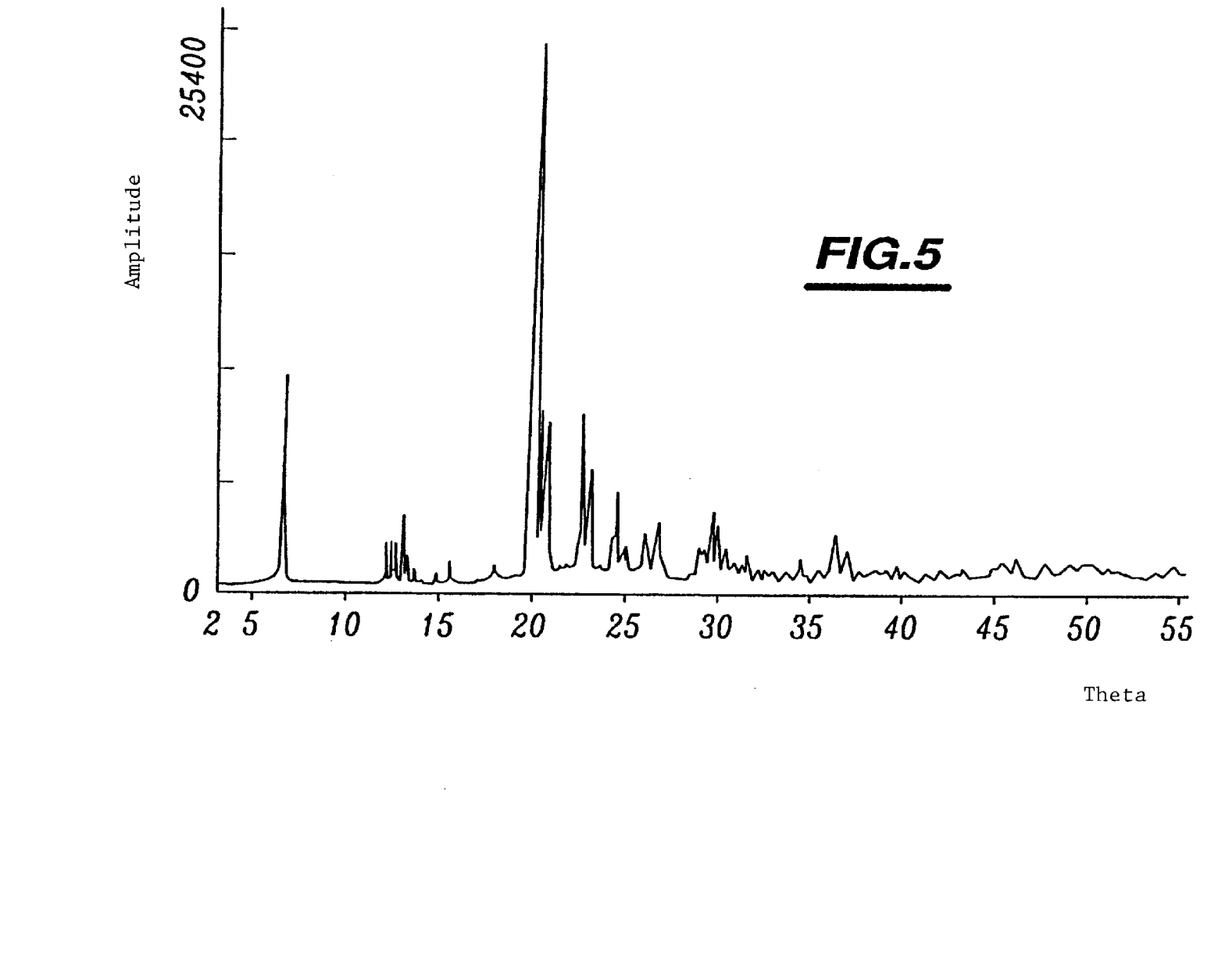
FIG. 5 is an X-ray diffraction representation of the suspension S1 dried at room temperature.

In contrast, the spectrum obtained on the S2 product after drying (FIG. 5) reveals essentially amorphous compounds: less than 10% of crystalline phase (alunite type phase) is observed.

These analyses, in combination with the above evaluations presented in Examples 9 and 10, demonstrate the advantage obtained with the products according to the invention, that is to say in which, after drying, the aluminium is present at least partially in one or more amorphous inorganic phases.

EXAMPLE 12

Demonstration of Amorphous Dispersed Solid

After centrifuging the S2 suspension for 6 h at 30,000 revolutions/min, 1 ml of the supernatant is withdrawn and acidified with 1 ml of 1% nitric acid and then the aluminium is quantitatively determined by plasma emission spectrometry. The results are given with a relative error of 10%. This quantitative determination, in combination with ascertaining the amount of supernatant and of sediment, makes it possible to trace back the percentage of the total aluminium in solution and, by difference, the percentage of aluminium present in dispersed solid phases.

In the S2 suspension, the compounds comprising Al are distributed in the following way:

75% of the aluminium is in solution,

25% is present in dispersed solid phases.

It is thus shown that, with respect to the product as is, the aluminium is present at least partially in a dispersed solid compound (capable of separating by settling during ultracentrifuging).

Furthermore, an X-ray diffraction analysis (X-ray diffraction—Siemens D 500 device (theta-theta)) is carried out on a sample of S2 product as protected from drying by a milar film. The product is virtually completely amorphous (less than 1% of crystalline aluminium sulphate).

By bringing together these two observations, it is demonstrated that, in the S2 product, the aluminium is present at least partially in inorganic phases existing in the form of an amorphous dispersed solid.

What is claimed is:

1. Aqueous suspension comprising:

A) silica and/or alumina particles, and

B) a compound of general formula (I):

with:

a ranging from 0.1 to 2, inclusive, b ranging from 0.3 to 1.5, inclusive, c ranging from 0 to 0.1, inclusive, d greater than 0.05, Y chosen from alkali metals and alkaline earth metals, x ranging from 2 to 4, inclusive and its derivatives, said compound (B) being present in the suspension at a concentration of at least 1.65 mol/l, expressed as moles of aluminum originating from said compound.

2. Aqueous suspension according to claim 1, wherein the compound (B) of general formula (I) exhibits an amorphous structure after having been dried, said structure representing at least 15% by weight of the compound (B).

3. Aqueous suspension according to claim 1, wherein the compound (B) is at least partially in the form of an amorphous dispersed solid.

4. Aqueous suspension according to claim 1, wherein, in the general formula of the compound (B): a is between approximately 0.75 and 2 and b is between approximately 0.3 and 1.2.

5. Aqueous suspension according to claim 1, wherein said suspension comprises approximately from 2.1 to 3.5 mol/l of aluminum, approximately from 2.25 to 4 mol/l of sulphate and approximately from 0.2 to 3.5 mol/l of silica.

6. Aqueous suspension according to claim 1, having a pH of ranging from 2.5 to 4, inclusive.

7. Aqueous suspension according to claim 1, comprising compound (B) of general formula (1) in which a has a value of the order of 1.26±0.1, 0.5±10.1 or 0.88±0.1.

8. Aqueous suspension according to claim 1, comprising a compound of general formula (I) in which a ranging from 0.1 to 1.5, inclusive and in that it comprises approximately from 2.2 to 3.1 mol/l of aluminum and approximately 2.3 to 3.9 mol/l of sulphate.

9. Aqueous suspension according to claim 1, comprising approximately from 0.7 to 2.4 mol/l of silica.

10. Aqueous suspension according to claim 1, wherein the silica comprises fumed silicas, precipitated silicas, silica sols, silica gels, pyrogenic silicas, silica compounds of natural or synthetic origin, aluminosilicates, smectites, magnesium silicates, clays, wollastonite, talc, mica, attapulgite, sepiolite, montmorillonite and/or bentonites.

11. Aqueous suspension according to claim 1, additionally comprising calcium silicates and aluminates.

12. Process useful for preparing an aqueous suspension as defined in claim 1, comprising:

A—mixing aluminum sulphate, silica and/or alumina particles, and optionally water;

B—optionally adding, to the mixture obtained according to Stage A, an alkaline silicate in the form of an aqueous solution and homogenizing said mixture at room temperature;

C—adding, to the mixture obtained according to Stage B, an alkaline aluminate in the form of an aqueous solution, with vigorous stirring and at room temperature;

D—bringing the combined mixture to a temperature of between 40 and 90° C. and recovering the expected suspension.

13. Process according to claim 12, further comprising the addition of an aluminum sulphate during one or more of Stages A, B, C or D.

14. Process according to claim 12, wherein the aluminum sulphate, mixed in Stage A with the suspension of silica and/or of alumina, is in the form either of a powder or of a solution brought to a temperature of between 95 and 130° C.

15. Process according to claim 12, wherein the aluminum sulphate is introduced in the form of a solution or of a powder during Stage A.

16. Process according to claim 12, wherein, during Stage A, the silica and/or the alumina are introduced in the form of suspensions or of powder(s).

17. Process according to claim 12, wherein the silica is introduced in the form of an aqueous suspension, said aqueous silica suspension being an aqueous suspension of precipitated silica obtained by mechanically breaking up a filtration cake resulting from a silica precipitation reaction.

18. A method for setting and/or hardening a cement paste, a mortar or a concrete comprising introducing an effective amount of the aqueous suspension according to claim 1 as a hardening or accelerating agent.

19. The method according to claim 18, wherein the compound (B) of general formula (I) is employed at a concentration of greater than approximately 0.003 mol per 100 g of cement used to prepare a cement paste, a mortar or a concrete.

20. The method according to claim 18, wherein the compound (B) is used in the form of a suspension.

21. Process for spraying concrete or mortar in order to apply a layer of concrete or of mortar on a surface utilizing a spraying means, the process comprising introducing a compound (B) of overall formula (I) as defined in claim 1 just upstream of or at the spraying means.

22. Process according to claim 21, using compound (B) of general formula (I) at a concentration of greater than approximately 0.003 mol per 100 g of cement employed to prepare the concrete or mortar.

23. Process according to claim 21, wherein either a dry mixture of concrete or of mortar or a wetted mixture of concrete or of mortar is formed, said mixture is transferred in order to introduce it into a spraying means, a compound (B) of general formula (I) is added to the wetted or non-wetted mixture just upstream or at the place of the spraying means and the resulting mixture is sprayed from the spraying means onto the surface to be treated.

24. Process according to claim 21, wherein the compound (B) is introduced in the form of an aqueous suspension.

25. A process for preparing an aqueous suspension comprising the steps of:

A—mixing aluminum sulphate, silica and/or alumina particles, and water to form a first mixture;

B—adding an alkaline silicate in the form of an aqueous solution to the first mixture formed in step A to form a second mixture, and homogenizing said second mixture at room temperature;

C—adding an alkaline aluminate in the form of an aqueous solution to the second mixture formed in step C with vigorous stirring and at room temperature to form a third mixture;

D—bringing the third mixture to a temperature of between 40 and 90° C.; and

E—adding aluminum sulphate during one or more of steps A, B, C, or D.

\* \* \* \* \*